Oct. 10, 1939.  J. MASIN  2,175,440
PERCOLATOR
Filed Nov. 12, 1938  2 Sheets-Sheet 1
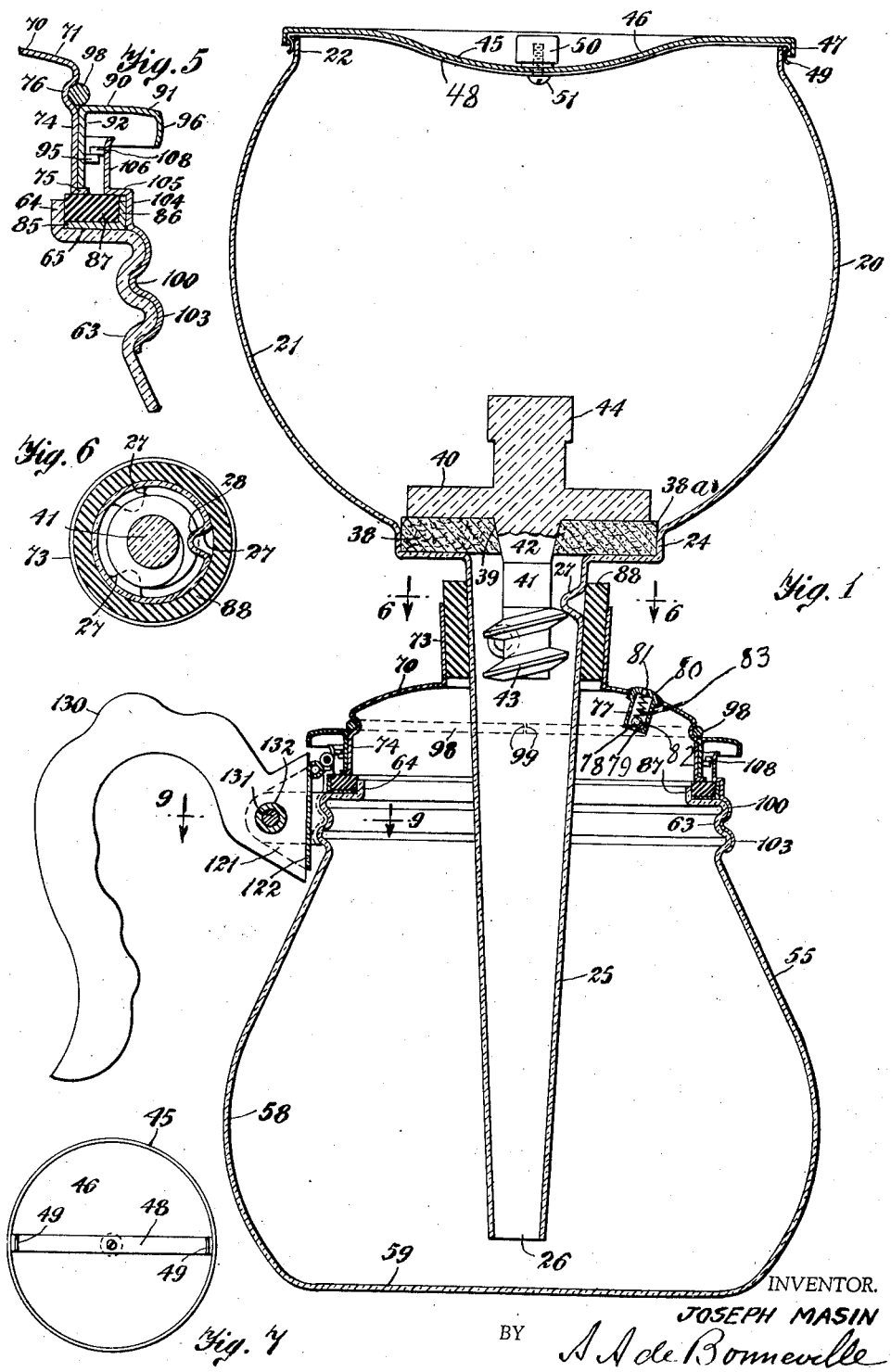
INVENTOR.
JOSEPH MASIN
BY A. A. de Bonneville
ATTORNEY.

Oct. 10, 1939.  J. MASIN  2,175,440
PERCOLATOR
Filed Nov. 12, 1938   2 Sheets-Sheet 2
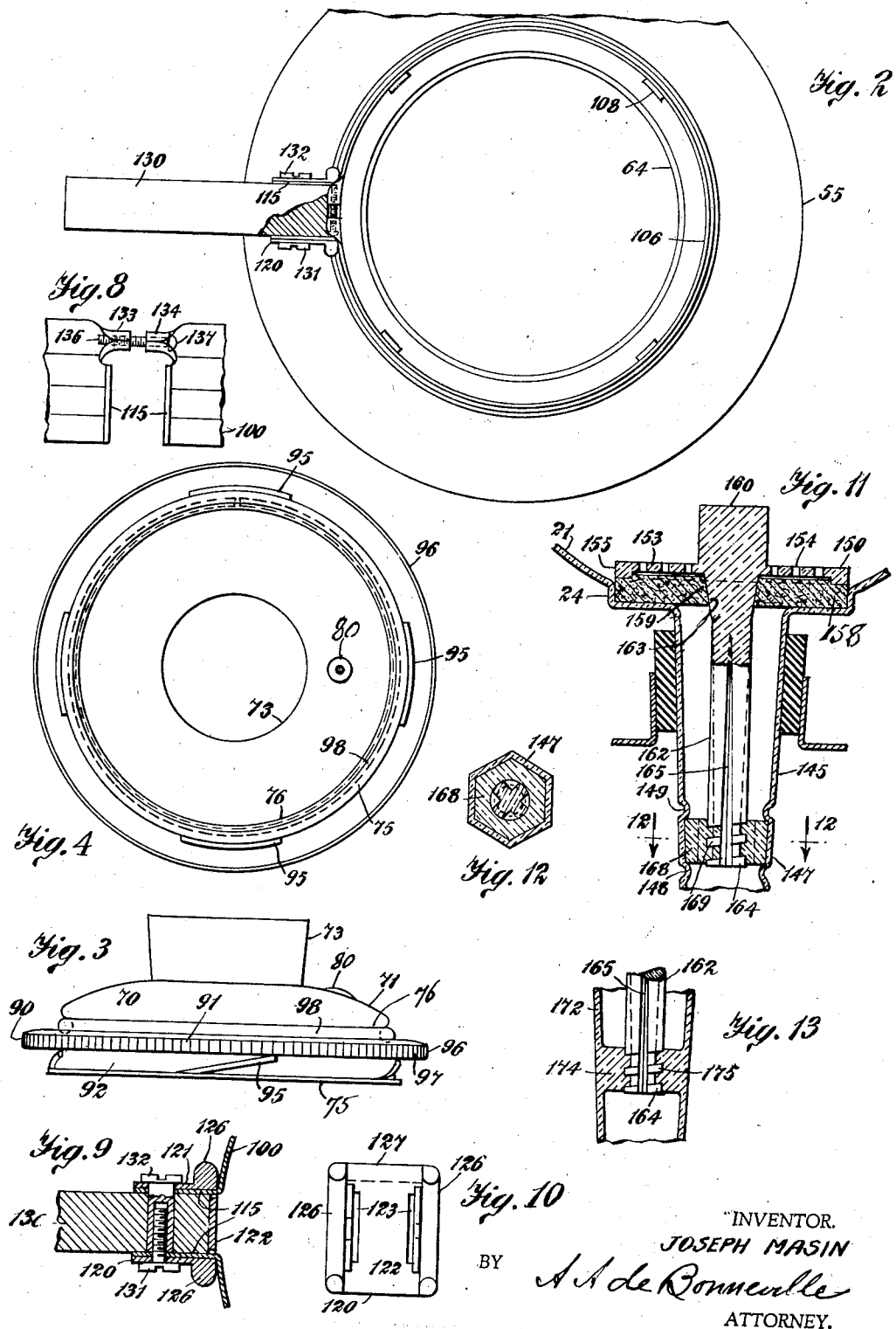
INVENTOR.
JOSEPH MASIN
BY A. A. de Bonneville
ATTORNEY.

Patented Oct. 10, 1939

2,175,440

UNITED STATES PATENT OFFICE 2,175,440

PERCOLATOR

Joseph Masin, New York, N. Y.

Application November 12, 1938, Serial No. 240,071

5 Claims. (Cl. 53—3)

This invention relates to a percolator and is a continuation in part of the application for Percolator filed July 1, 1937, Serial No. 151,403.

The object of the invention is the production of a percolator for coffee and the like, which comprises a pair of detachable receptacles, that have interposed between them a flexible filter, by means of which coffee grounds, oils and the like and other foreign matter are prevented entering the fluid coffee and the like, to prevent the latter becoming rancid.

Other objects will be apparent from the specification and drawings.

In the drawings Fig. 1 represents an axial vertical section of the improved percolator with portions in full lines; Fig. 2 shows a partial top plan view of the lower portion of Fig. 1 with a partial horizontal section; Fig. 3 indicates an elevation of a detail of the lower portion of Fig. 1; Fig. 4 shows a bottom view of Fig. 3; Fig. 5 represents an enlarged fragmentary portion of Fig. 1; Fig. 6 indicates an enlarged section of Fig. 1 on the line 6, 6; Fig. 7 shows a bottom view on a reduced scale of an element of the upper portion of Fig. 1; Fig. 8 represents an enlarged left hand side view of a portion of Fig. 2. Fig. 9 shows an enlarged section of Fig. 1 on the line 9, 9; Fig. 10 indicates a left hand view of a portion of Fig. 9; Fig. 11 indicates a modification in section of a portion of Fig. 1; Fig. 12 is a section of Fig. 11 on the line 12, 12 and Fig. 13 shows a further modification of Fig. 1.

In the drawings, 20 indicates an upper spherical shaped receptacle for coffee, preferably of glass, which coacts with the lower bulb shaped receptacle 55, for water, preferably of glass.

The spherical shaped receptacle 20 is indicated with the spherical body portion 21, which has extending from its upper open end the cylindrical flange 22. The lower end of the body portion 21, has integral therewith the cup shaped seat 24. A conical shaped nozzle 25, having the bottom opening 26, extends from the seat 24 into the bulb shaped receptacle 55.

Adjacent to the upper end of the nozzle 25, see Figs. 1 and 6, are indicated the three tapered projections 27, having the curved crowns 28. The projections 27 extend inwardly from the outer surface of the nozzle 25, and the axial centers of the projections 27 are in a helical line, not shown, extending around the surface of said nozzle. The said projections 27 function as a screw thread.

In the cup shaped seat 24, is positioned the cylindrical disc 38 of resilient filtering material, having the tapered opening 39 at its axial center as indicated.

Upon the disc 38 is positioned the cylindrical adjusting disc 40. A cylindrical stem 41, having the upper tapered portion 42 and the helical thread 43 at its lower end, extends from the disc 40. A cylindrical cap 44 extends from the upper face of the disc 40. The said disc with its parts is preferably made of glass, and its thread 43 is adapted to function with projections 27, of the nozzle 25. After the disc 38 has been seated on the seat 24, the cap 44 is turned until the requisite pressure is brought upon the disc 38 of filtering material to maintain the latter in position. The tapered portion 42 of the stem 41, coacting with the tapered opening 39 of the disc 38, prevents leakage through said opening 39.

Upon the flange 22 of the upper spherical shaped receptacle 20, is clamped the detachable cover 45 having the concaved wall 46, and the vertical flange 47. A spring latch 48, having the curved ends 49, bears against the bottom face of the cover 45. A handle 50 bears on the outer face of the cover 45, and is held in place by the screw 51.

The bulb shaped receptacle 55, see Figs. 1 and 5, is indicated with the bulb shaped wall 58, the bottom wall 59, and the fluted neck 63 at its upper end, which terminates in the vertical flange 64, and the horizontal seat 65.

A detachable cover of glass or metal for the receptacle 55 is indicated in its entirety by the numeral 70. The said cover 70 comprises the hood shaped wall 71, from which extends upwardly the tapered tubular support 73. The cylindrical wall of the cover 70 is indicated at 74, and extends from the wall 71. The wall 74 at its lower end has integral therewith the foot 75, and at its upper end is shown the cylindrical locking groove 76.

The hood shaped wall 71 has extending from its inner face the cylindrical casing 77, with the bottom wall 78, having the opening 79. A cap 80, with the opening 81, is screwed to the top face of the wall 71. A ball valve 82, with the spring 83, is positioned in the casing 77 to release excess pressure in the bulb shaped receptacle 55.

An angle shaped metallic ring comprises the horizontal supporting member 85 and the vertical flange 86. The member 85 is positioned upon the seat 65.

A rubber gasket 87 is positioned upon the supporting member 85, between the flanges 64 and 86. An annular rubber plug 88, is seated in the tubular support 73 and hugs the nozzle 25.

An adjustable locking member for the cover 70 is indicated in its entirety by the numeral 90 and preferably of metal, see Figs. 1, 3, 4 and 5. The locking member 90 comprises the top wall 91 from which extends the cylindrical wall 92, with the locking cams 95. An outer vertical wall 96 with the serrations 97, extends from the top wall 91. A snap ring 98, with the ends 99, is seated in the locking groove 76 and bears on the wall 91 to maintain the latter in position.

A clamping band is designated in its entirety by the numeral 100, and comprises the lower fluted portion 103, which engages the fluted neck 63 of the receptacle 55. From the fluted portion 103, extends the vertical flange 104, and the latter joins with the horizontal annular portion 105. The vertical member 106 extends from the portion 105. From the member 106, extends the horizontal locking cams 108 which coact with the inclined locking cams 95.

From the ends of the band 100, extend the lugs 115. Upon the lugs 115, is supported the handle bracket designated in its entirety by the numeral 120, see Figs. 1, 9 and 10. The handle bracket 120, comprises the triangular shaped side members 121, which extend from the rear member 122, having the openings 123 for the lugs 115. Cylindrical projections 126 extend from the sides of the rear member 122, and a cylindrical projection 127 extends from the top of the member 122.

A handle is indicated at 130, and its upper end is positioned between the lugs 115. A screw 131 coacts with the tap screw 132. The said screws extend through the upper end of the handle 130 to detachably clamp the same between the lugs 115.

At the upper portions of the ends of the band 100, are indicated the threaded sleeve 133 and the sleeve 134. A screw 136, is shown with its head 137. The screw 136 is in threaded engagement with the sleeve 133 and its head bears against the sides of the sleeve 134 to adjustably connect the open ends of the band 100 in operative position.

Referring to the modification in Figs. 11 and 12, the spherical body portion 21 of the upper receptacle 20, is again shown with its cup shaped seat 24. A conical shaped nozzle 145, similar to 25, extends from the seat 24. In about the middle portion of the nozzle 145, is indicated the hexagonal portion 147. Below the portion 147, is indicated the circular shaped supporting flange 148 and above said portion 147, is shown the upper circular clamping flange 149. For the cup shaped seat 24, is provided the disc shaped strainer preferably of glass indicated in its entirety by the numeral 150. The strainer 150, in this instance, comprises the cup shaped hood 153, which has extending therethrough the perforations 154, and is shown with the lower circular flange 155. In the cup shaped seat 24, is positioned the disc 158, having the tapered opening 159 of filtering material.

The hood 153 has extending from its upper face the adjusting cap 160. From the lower face of the hood 153, extends the cylindrical stem 162 with the tapered portion 163 and the latter extends through the tapered opening 159 of the disc 158. The lower end of the stem 162 is shown with the threaded portion 164. Longitudinal conveying channels 165, are indicated in the outer surface of the stem 162. An hexagonal adjusting plug 168, preferably of glass, is seated upon the supporting flange 148 of the nozzle 145. After the plug 168 is positioned in place, the clamping flange 149 is formed in the nozzle 145, for the plug 168. The plug 168, is provided with an interior thread 169, which is in mesh with the threaded portion 164 of the stem 162. By turning the cap 160, the flange 155 is brought to bear upon the disc 158 of filtering material to clamp it in operative position.

Referring to Fig. 13, a fragmentary portion of a modified inlet and outlet nozzle is indicated at 172. The modified nozzle 172 has integral therewith the disc member 174, having an axial threaded opening 175. The cylindrical stem 162 is again shown with the threaded portion 164, which latter engages the threaded opening 175. The conveying channels are again shown at 165.

To operate the percolator its members are assembled as indicated in Fig. 1, and the receptacle 20 with its nozzle 25, is removed from the bulb shaped portion 55. Water is poured into the receptacle 55 through the tubular support 73, and the receptacle 20 is again placed in operative position, and the cover 45 is removed from the receptacle 20. The ground coffee is then dropped into the receptacle 20 through its upper open end. The user then places the cover 45 again in position and the percolator is placed on a heated stove and the like, by means of which the water in the receptacle 55 is heated. The vapor generated in the receptacle 55 bears upon the water therein, and thereby the said water is forced up and through the nozzle 25, the filtering material 38, and from the latter escapes at its circumferential end 38a and flows into the receptacle 20.

The water mixes with the ground coffee in said receptacle 20. The receptacle 55 is now removed from the source of heat and a partial vacuum is formed in said receptacle 55. The liquid coffee in the receptacle 20 is drawn into the receptacle 55, and the coffee grounds, oils and other foreign matter remain in the receptacle 20.

The receptacle 20 with its appurtenances are removed from the receptacle 55 and the liquid coffee in the latter is ready for use. When the receptacle 20 is removed from the receptacle 55, it is placed upside down and the cover 45 prevents any of its contents escaping from the same.

The fact that the disc 40 is made of glass, preserves the purity of the coffee and the tapered portion 42 of the stem 41 in contacting with the disc 38 of filtering material provides a tight connection between the portion 42 of the stem 41 and the disc 38, and prevents the coffee grounds entering the receptacle 55. The disc 38 of filtering material which is resilient provides a cushion between the cup shaped seat 24 and the disc 40, and prevents the breakage of the receptacle 20 and injury to the connections between the stem 41 and the projections 27.

The fact that the locking member 90 is rotatable and that its wall 92 bears upon the foot 75, instead of the gasket 87, the cover 70 is easily removed.

It will be noted that the coaction of the cams 95 and 108 force the foot 75 against the gasket 87 and provide a seal between the cover 70 and the receptacle 55, to enable a partial vacuum to be formed in said receptacle 55.

Various modifications may be made in the invention and the present exemplification is to be taken as illustrative and not limitative thereof.

Having described my invention I claim:

1. In a percolator the combination of an upper receptacle and a lower receptacle detachably connected to the upper receptacle, a nozzle extending from the upper receptacle into the lower receptacle, a disc of resilient filtering material bearing on the inner face of the upper receptacle over the opening of said nozzle, an adjusting disc bearing upon the disc of filtering material, said adjusting disc having a stem extending through the disc of filtering material and into said nozzle and means to detachably connect said stem to said nozzle to bear said adjusting disc against the disc of filtering material.

2. In a percolator the combination of an upper receptacle and a lower receptacle detachably connected to each other, a nozzle extending from the upper receptacle into the lower receptacle, a disc of filtering material bearing on the inner face of the upper receptacle over the opening of said nozzle and an adjusting disc bearing upon the disc of filtering material, said adjusting disc having a stem extending through the disc of filtering material and into said nozzle and in threaded engagement with said nozzle to detachably bear said adjusting disc against the disc of filtering material.

3. In a percolator the combination of an upper receptacle and a lower receptacle detachably connected to the upper receptacle, a nozzle extending from the upper receptacle into the lower receptacle, said nozzle having projections extending from its inner face positioned to function as a screw thread, a disc of filtering material bearing on the inner face of the upper receptacle over the opening of said nozzle, and an adjusting disc bearing upon the disc of filtering material, said adjusting disc having a stem extending through the disc of filtering material and into said nozzle, said stem having a helical thread thereon coacting with the projections of said nozzle to bear said adjusting disc against the disc of filtering material.

4. In a percolator the combination of an upper receptacle and a lower receptacle detachably connected to the upper receptacle, said upper receptacle having a cup shaped seat at its lower end, a nozzle extending from the cup shaped seat, said nozzle having projections extending from its inner face positioned to function as a screw thread, a disc of resilient filtering material having a tapered opening bearing on said cup shaped seat over the opening of said nozzle and an adjusting disc having a cap extending from the top face thereof, and having a stem with a tapered upper portion extending from its lower face, said tapered portion bearing against the tapered opening of the disc of resilient filtering material and having a helical thread thereon coacting with the projections of said nozzle to bear said adjusting disc against the disc of filtering material and to force the tapered portion of said stem against the tapered opening of the disc of filtering material.

5. In a receptacle the combination of an upper receptacle, and a lower receptacle detachably connected to the upper receptacle, said upper receptacle having a cup shaped seat at its lower end, a nozzle extending from said cup shaped seat, said nozzle having an adjusting plug with an internal thread supported therein, a disc of filtering material having a tapered opening bearing on said cup shaped seat and over the opening of said nozzle and a cup shaped strainer having perforations bearing on said disc of filtering material, said strainer having an adjusting plug extending from its upper face and having a stem extending from its lower face, with a tapered upper portion bearing against the tapered opening of the disc of filtering material, said stem having a threaded portion engaging the thread of said plug and said stem having longitudinal conveying channels.

JOSEPH MASIN.